United States Patent
Klinkhammer et al.

(10) Patent No.: US 8,661,844 B2
(45) Date of Patent: Mar. 4, 2014

(54) DOOR FOR CONTROLLING TEMPERATURE AND AIRFLOW DISTRIBUTION OF A HEATING, VENTILATION, AND AIR CONDITIONING SYSTEM IN A VEHICLE

(75) Inventors: John Klinkhammer, Canton, MI (US); Jason Hendry, Milford, MI (US)

(73) Assignee: DENSO International America, Inc., Southfield, MI (US)

( * ) Notice: Subject to any disclaimer, the term of this patent is extended or adjusted under 35 U.S.C. 154(b) by 401 days.

(21) Appl. No.: 13/118,920

(22) Filed: May 31, 2011

(65) Prior Publication Data

US 2012/0248205 A1    Oct. 4, 2012

Related U.S. Application Data

(60) Provisional application No. 61/468,968, filed on Mar. 29, 2011.

(51) Int. Cl.
    *F25D 17/04*     (2006.01)

(52) U.S. Cl.
    USPC ............................................. 62/404; 62/419

(58) Field of Classification Search
    USPC ........... 62/404, 239, 244, 160, 186, 187, 419; 454/107, 143; 165/42
    See application file for complete search history.

(56) References Cited

U.S. PATENT DOCUMENTS

| | | | |
|---|---|---|---|
| 5,062,352 A | 11/1991 | Ostrand | |
| 5,676,595 A * | 10/1997 | Sumiya et al. | 454/121 |
| 5,950,711 A | 9/1999 | Bendell | |
| 6,852,024 B2 * | 2/2005 | Seki | 454/121 |
| 7,563,159 B2 * | 7/2009 | Newman et al. | 454/156 |
| 7,823,399 B2 * | 11/2010 | Egawa | 62/178 |
| 2006/0254295 A1 * | 11/2006 | Kim et al. | 62/239 |
| 2009/0124187 A1 * | 5/2009 | Sievers et al. | 454/75 |

* cited by examiner

*Primary Examiner* — Mohammad M Ali
(74) *Attorney, Agent, or Firm* — Harness, Dickey & Pierce, P.L.C.

(57) ABSTRACT

A heating, venting, and air conditioning (HVAC) system for a vehicle according to the principles of the present disclosure includes a blower, an evaporator, a heater core, and a single door. The blower is operable to blow air. The evaporator is positioned downstream from the blower and is operable to cool air flowing through the evaporator. The heater core is positioned downstream from the evaporator and is operable to heat air flowing through the heater core. The single door is positioned downstream from the heater core and is rotatable to control airflow through the heater core and to direct airflow to at least one of a first outlet and a second outlet.

10 Claims, 4 Drawing Sheets

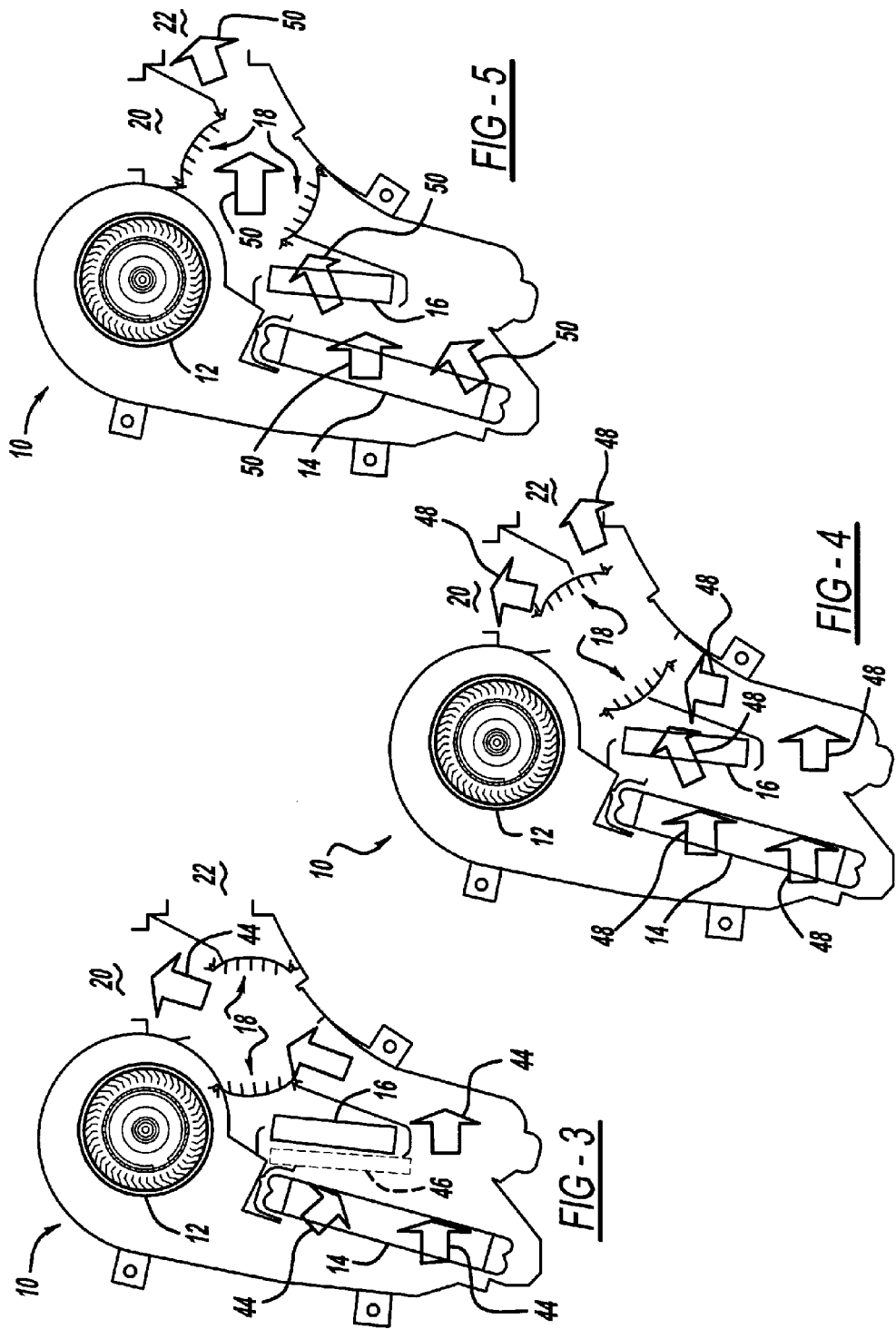

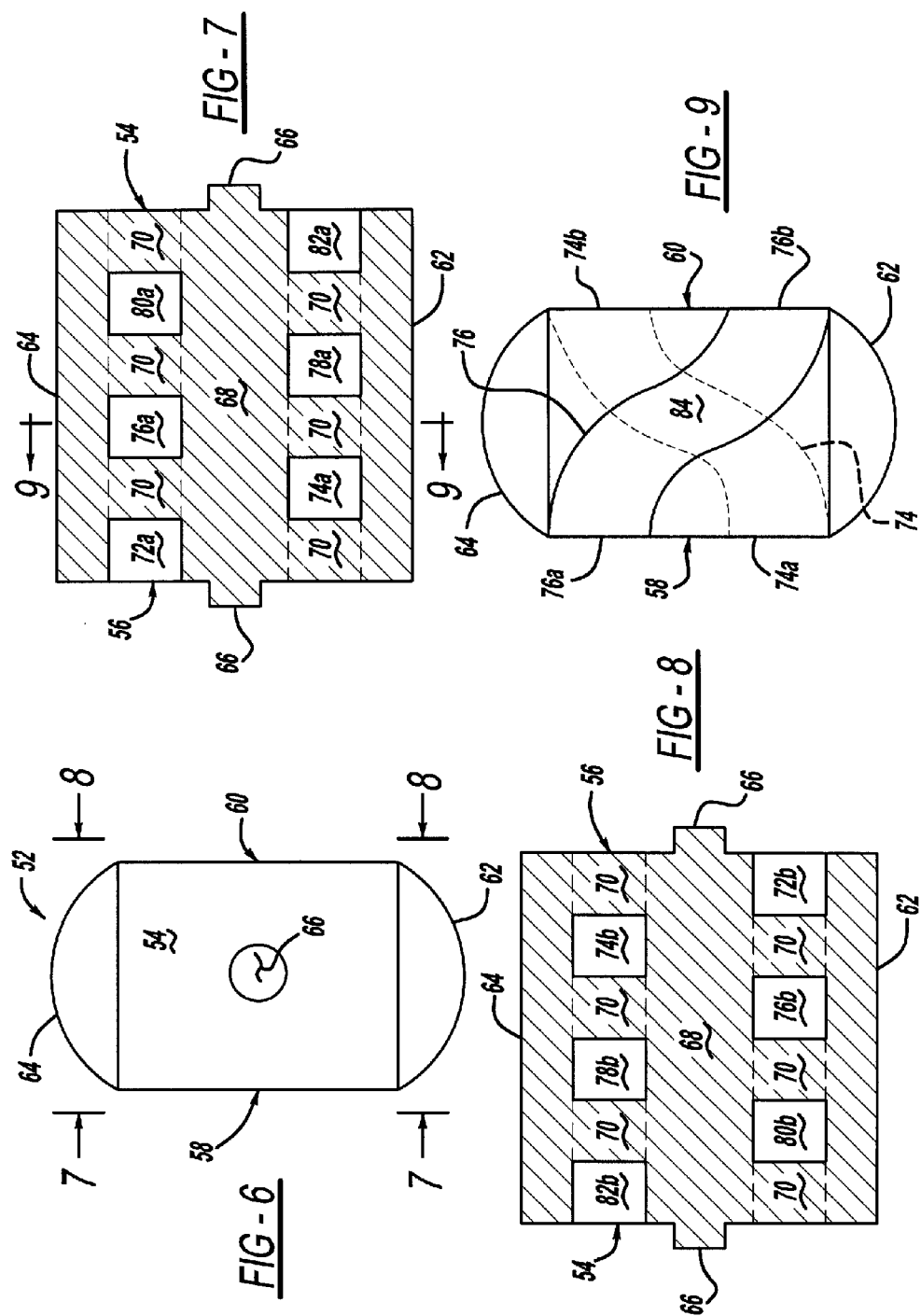

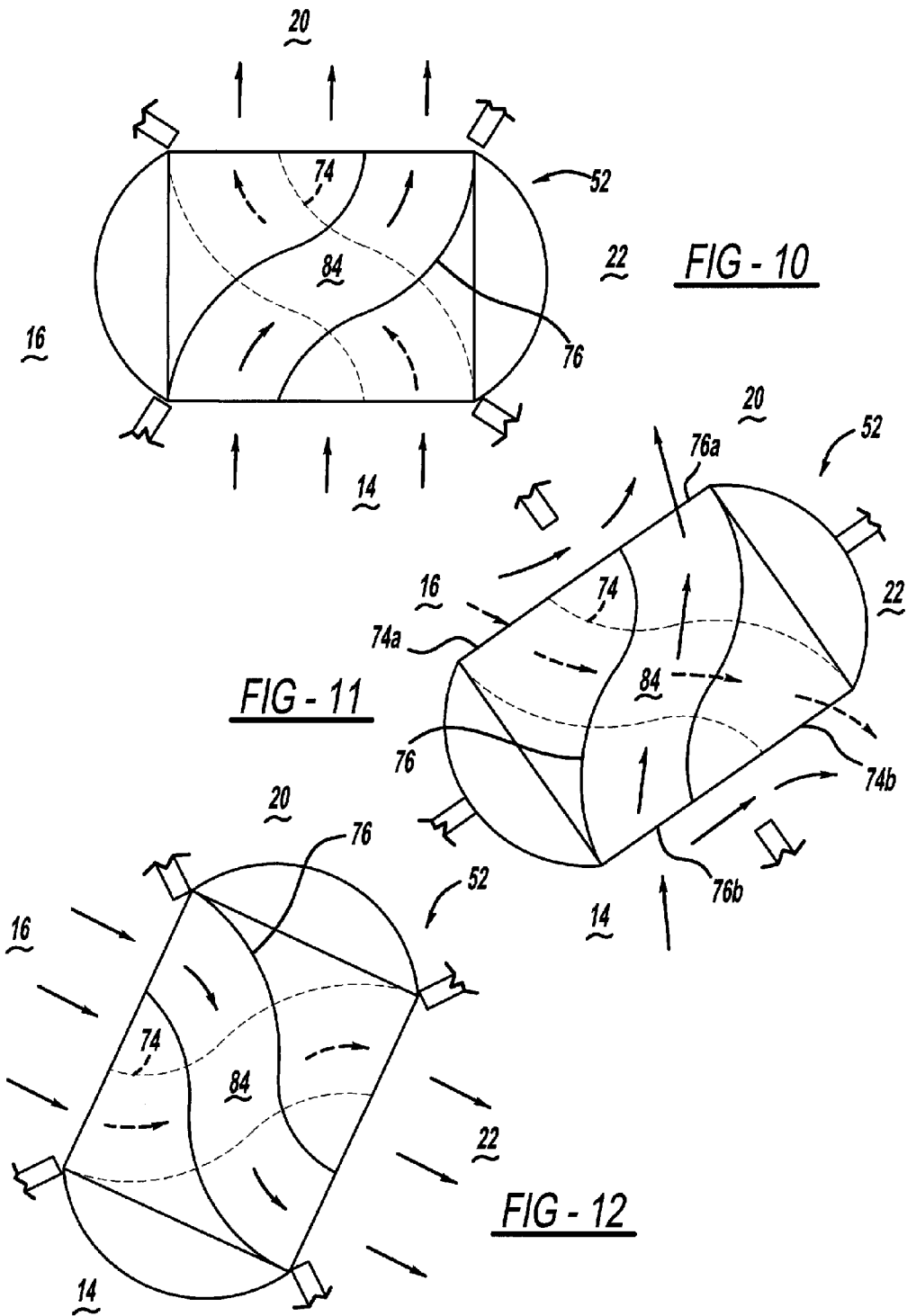

DOOR FOR CONTROLLING TEMPERATURE AND AIRFLOW DISTRIBUTION OF A HEATING, VENTILATION, AND AIR CONDITIONING SYSTEM IN A VEHICLE

CROSS-REFERENCE TO RELATED APPLICATIONS

This application claims the benefit of U.S. Provisional Application No. 61/468,968, filed on Mar. 29, 2011. The entire disclosure of the above application is incorporated herein by reference.

FIELD

The present disclosure relates to a door for controlling temperature and airflow distribution in a heating, ventilation, and air conditioning system in a vehicle.

BACKGROUND

This section provides background information related to the present disclosure which is not necessarily prior art.

Heating, venting, and air conditioning (HVAC) systems in a vehicle typically include a blower, an evaporator, a heater core, a temperature door, and an airflow door. The blower blows air through the evaporator and the heater core. The temperature door controls the temperature of airflow exiting the HVAC system by adjusting airflow through the evaporator and/or the heater core. The airflow door controls the distribution of airflow exiting the HVAC system by adjusting airflow to various outlets.

HVAC systems that include two doors to control temperature and airflow distribution typically include a linkage that couples the two doors. These HVAC systems may be difficult to package in a vehicle due to space constraints, such as those associated with auxiliary HVAC systems. In addition, these systems include a large number of parts, increasing complexity and cost.

SUMMARY

This section provides a general summary of the disclosure, and is not a comprehensive disclosure of its full scope or all of its features.

A heating, venting, and air conditioning (HVAC) system for a vehicle according to the principles of the present disclosure includes a blower, an evaporator, a heater core, and a single door. The blower is operable to blow air. The evaporator is positioned downstream from the blower and is operable to cool air flowing through the evaporator. The heater core is positioned downstream from the evaporator and is operable to heat air flowing through the heater core. The single door is positioned downstream from the heater core and is rotatable to control airflow through the heater core and to direct airflow to at least one of a first outlet and a second outlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a section view of the HVAC system of FIG. 1 illustrating the first door adjusted to a first position;

FIG. 4 is a section view of the HVAC system of FIG. 1 illustrating the first door adjusted to a second position;

FIG. 5 is a section view of the HVAC system of FIG. 1 illustrating the first door adjusted to a third position;

FIG. 6 is a planar view of a second door for controlling temperature and airflow distribution of an HVAC system according to the principles of the present disclosure;

FIG. 7 is a planar view of the second door in the direction of arrows 7 shown in FIG. 6;

FIG. 8 is a planar view of the second door in the direction of arrows 8 shown in FIG. 6;

FIG. 9 is a section view of the second door taken along a line extending between arrows 9 shown in FIG. 7 and in the direction of the arrows 9;

FIG. 10 is the section view of FIG. 9 illustrating the second door adjusted to the first position;

FIG. 11 is the section view of FIG. 9 illustrating the second door adjusted to the second position; and FIG. 12 is the section view of FIG. 9 illustrating the second door adjusted to the third position; and Corresponding reference numerals indicate corresponding parts throughout the several views of the drawings.

DETAILED DESCRIPTION

Example embodiments will now be described more fully with reference to the accompanying drawings.

Figure 1:
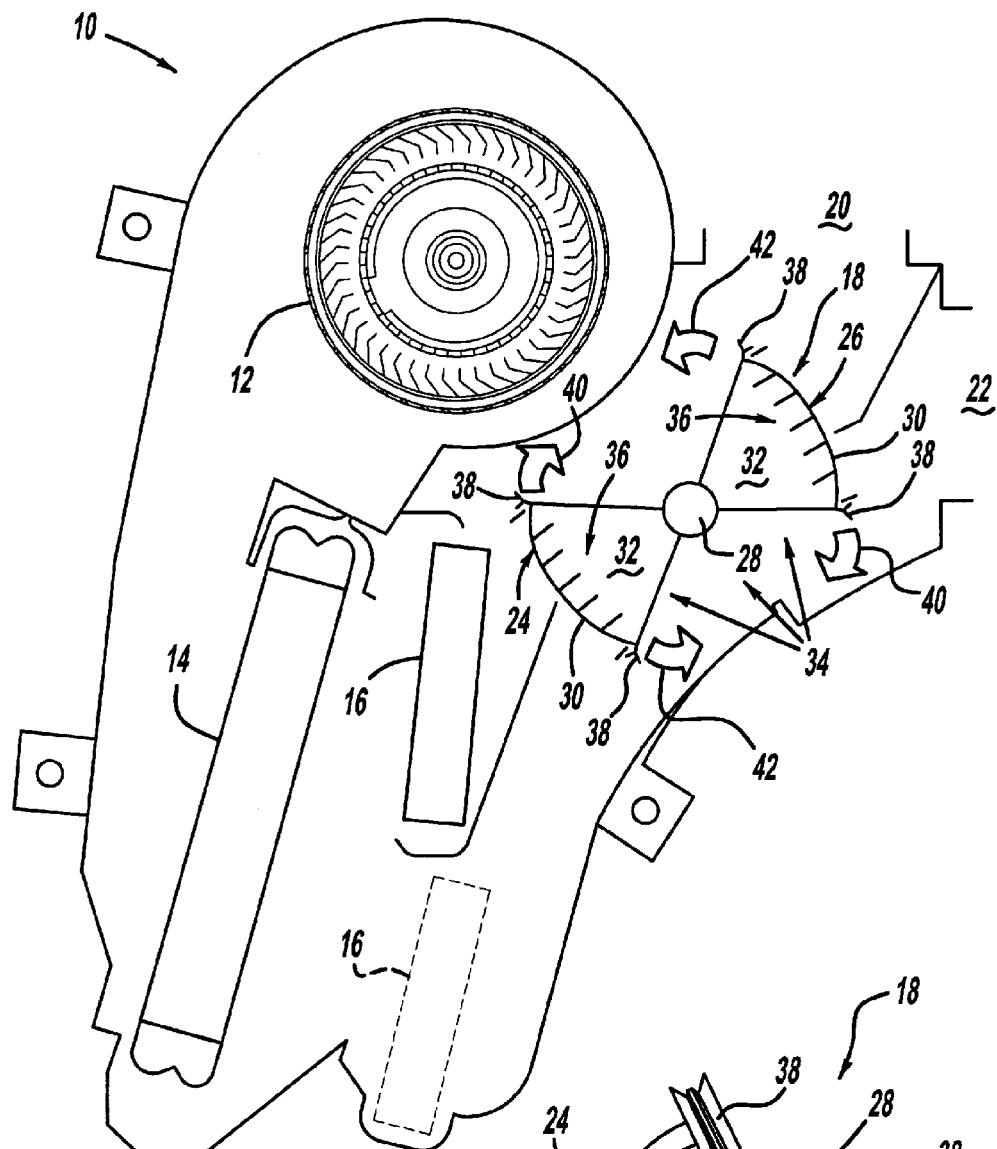
FIG. 1 is a section view of a heating, venting, and air conditioning (HVAC) system including a first door for controlling temperature and airflow distribution according to the principles of the present disclosure.

Referring to FIG. 1, a heating, ventilation, and air conditioning (HVAC) system 10 includes a blower 12, an evaporator 14, a heater core 16, and a door 18. The blower 12 blows air through the evaporator 14 and the heater core 16. The evaporator 14 cools air flowing through the evaporator 14. The heater core 16 heats air flowing through the heater core 16. The door 18 controls the temperature and distribution of airflow exiting the HVAC system 10. The HVAC system 10 is an auxiliary or rear HVAC system for a vehicle, however, the door 18 may be included in a primary or front HVAC system for a vehicle.

The door 18 controls the temperature by adjusting the amount of airflow through the heater core 16. The door 18 controls the airflow distribution by adjusting the amount of airflow directed to an outlet 20 and an outlet 22. The outlet 20 may be a face outlet and the outlet 22 may be a foot outlet. Alternatively, the outlet 20 may be the foot outlet and the outlet 22 may be the face outlet. Additionally, the heater core 16 may be positioned as shown in dashed lines. The location of the face and foot outlets may be independent from the position of the heater core 16.

Figure 2:
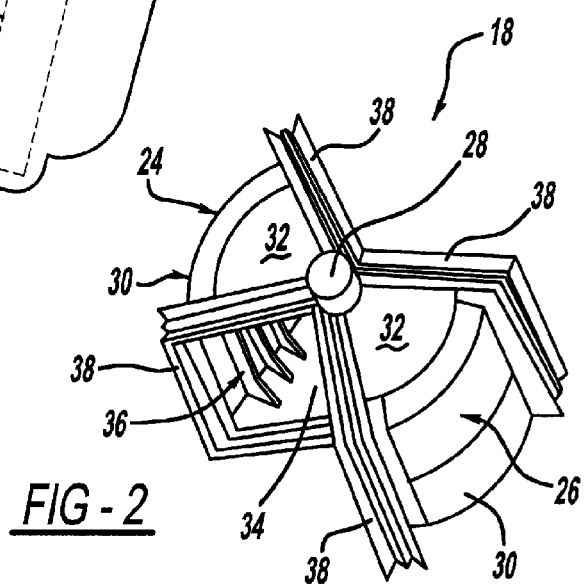
FIG. 2 is an isometric view of the door shown in FIG. 1.

With additional reference to FIG. 2, the door 18 includes a first portion 24, a second portion 26, and bosses 28 on opposite sides of the door 18 at the interface between the first portion 24 and the second portion 26. Components of the door 18 may be integrally formed as a single unit or formed separately and joined together. The first portion 24 and the second portion 26 may be symmetric with respect to a rotational axis of the door 18 extending through the bosses 28. To this end, the door 18 may be referred to as a dual door, as the first portion 24 and the second portion 26 may resemble opposite facing doors.

The first and second portions 24, 26 include closed ends 30 and closed sides 32 defining an opening 34 extending through the door 18. The closed ends 30 of the first and second portions 24, 26 may have a round or dome shape. To this end, the door 18 may be referred to as a dual dome door. The closed sides 32 of the first and second portions 24, 26 may have a flat pie shape. The opening 34 may extend between the closed ends 30 of the first and second portions 24, 26 and between the closed sides 32 of the first and second portions 24, 26. The bosses 28 may not extend through the closed sides 32 to leave the opening 34 undivided between the first and second portions 24, 26. In this regard, the first and second portions 24, 26 may be opposite-facing, pie-shaped portions defining a single hollow interior (i.e., the opening 34).

The first and second portions 24, 26 may include ribs 36 and seals 38. The ribs 36 may be formed on the inner surfaces of the closed ends 30 for structural support. The seals 38 may extend along the edges of the closed ends and sides 30, 32 defining the opening 34. When the door 18 hits a stop, such as an inner surface of a duct, the seals 38 may form a seal with the stop. The seals 38 may be rubber and the remainder of the door 18 may be plastic.

In operation, the door 18 may be rotated in the direction of arrows 40 to decrease the temperature of airflow exiting the HVAC system 10 and to direct more airflow to the outlet 20 and less airflow to the outlet 22. The door 18 may be rotated using an actuator (not shown), such as a servomotor, coupled to the bosses 28 of the door 18. Rotating the door 18 in the direction of the arrows 40 decreases the temperature of the exit airflow because less air is allowed to flow through the heater core 16.

Conversely, the door 18 may be rotated in the direction of arrows 42 to increase the temperature of airflow exiting the HVAC system 10 and to direct more airflow to the outlet 22 and less airflow to the outlet 20. Rotating the door 18 in the direction of the arrows 42 increases the temperature of the exit airflow because more air is allowed to flow through the heater core 16. In this manner, the temperature and distribution of the exit airflow may be adjusted by simply rotating the door 18.

Adjusting the temperature and distribution of the exit airflow using a single door eliminates the need to include multiple actuators driving multiple doors or complex linkages coupling a single actuator to multiple doors. In turn, the number of parts included in the HVAC system 10 and the amount of space required to package the HVAC system 10 in a vehicle are reduced relative to conventional HVAC systems. As a result, the cost and complexity of the HVAC system 10 are reduced relative to conventional HVAC systems.

Referring to FIGS. 3 through 6, the door 18 may be adjusted to various positions to control the temperature and distribution of airflow exiting the HVAC system 10. Each position may correspond to a mode of operating the HVAC system 10. Although only three positions are shown, the door 18 may be adjusted to positions between the three positions, and the positions between the three positions may correspond to transitional phases between the modes.

FIG. 3 shows the door 18 adjusted to a first position. When the door 18 is in the first position, the door 18 prevents air from flowing through the heater core 16 or the outlet 22 and allows air to flow around the heater core 16 (i.e., directly from the evaporator 14 to the outlet 20) and through the outlet 20. Arrows 44 represent the airflow through the HVAC system 10 when the door 18 is in the first position. Thus, the door 18 may be adjusted to the first position to provide maximum cooling and to direct all of the exit airflow to the outlet 20.

Additionally, the HVAC system 10 may include a sliding door 46. The sliding door 46 may be extended when the door 18 is in the first position, as shown in FIG. 3, to prevent scrubbing. Scrubbing occurs when heated air between the heater core 16 and the door 18 flows back through the heater core 16 and to the outlet 20. The sliding door 46 may be retracted when the door 18 is not in the first position to allow air to flow through the heater core 16.

FIG. 4 shows the door 18 in a second position. When the door 18 is in the second position, the door 18 allows air to flow through the heater core 16, around the heater core 16, to the outlet 20, and to the outlet 22. Arrows 48 represent the airflow through the HVAC system 10 when the door 18 is in the second position. Thus, the door 18 may be adjusted to the second position to provide some heating and to direct the exit airflow to both of the outlets 20, 22. Air flowing through the heater core 16 (i.e., hot air) may flow to the outlet 22, and air flowing around the heater core 16 (i.e., cold air) may flow to the outlet 20. The hot and cold air may mix within the door 18 due to their crossing flow paths, and air may bypass the door 18, which may eliminate temperature stratification.

FIG. 5 shows the door 18 in a third position. When the door 18 is in the third position, the door 18 allows air to flow through the heater core 16 and the outlet 22 and prevents air from flowing around the heater core 16 or through the outlet 20. Arrows 50 represent the airflow through the HVAC system 10 when the door 18 is in the third position. Thus, the door 18 may be adjusted to the third position to provide maximum heating and to direct all of the exit airflow to the outlet 22.

Referring to FIGS. 6 through 9, a door 52 may be similar to the door 18 and include additional features to improve the mixing of hot and cold air. The door 52 includes closed sides 54, 56, partially opened sides 58, 60, closed ends 62, 64 connecting the closed sides 54, 56, and bosses 66 projecting from the closed sides 54, 56 and centered about a rotational axis of the door 52. The door 52 may be symmetric with respect to a plane extending through the centers of the bosses 66 perpendicular to the closed sides 54, 56 and the partially open sides 58, 60. In addition, the closed ends 62, 64 may be dome shaped. To this end, the door 52 may be referred to as a dual dome door, as the symmetric portions of the door 52 may resemble two doors having dome-shaped ends.

FIG. 7 shows partition portions 68, 70 defining openings 72a through 82a to allow air to flow through the partially open side 58 of the door 52. When the door 52 is in the second position discussed above with reference to FIG. 4, the openings 72a, 76a, and 80a may allow cold air to flow out of the door 52, and the openings 74a, 78a, and 82a may allow hot air to flow into the door 52. Although FIG. 7 delineates the partition portions 68, 70, the partition portions 68, 70 may form a single partition extending between the closed ends 62, 64.

FIG. 8 shows the partition portions 68, 70 defining openings 72b through 82b to allow air to flow through the partially open side 60 of the door 52. When the door 52 is in the second position, the openings 72b, 76b, and 80b may allow cold air to flow into the door 52, and the openings 74b, 78b, and 82b may allow hot air to flow out of the door 52. Thus, the partition portions 68, 70 may define hot air channels 74, 78, and 82 respectively extending between the openings 74a, 78a, and 82a in the partially open side 58 and the openings 74b, 78b, and 82b in the partially open side 60. The partition portions 68, 70 may also define cold air channels 72, 76, and 80 respectively extending between the openings 72a, 76a, and 80a in the partially open side 58 and the openings 72b, 76b, and 80b in the partially open side 60.

FIG. 9 illustrates a mixing chamber 84 that extends between the closed sides 54, 56 and connects the hot and cold air channels 72 through 82, thereby improving the mixing between hot and cold airflow through the door 52. As shown in FIG. 9, the hot air channel 74 and the cold air channel 76 overlap, and the mixing chamber 84 extends between the overlapping portions of the channels 74, 76. Thus, hot air is allowed to flow from the hot air channel inlet 74a, through the mixing chamber 84, and to the cold air channel outlet 76a. Conversely, cold air is allowed to flow from the cold air channel inlet 76b, through the mixing chamber 84, and to the hot air channel outlet 74b. In this manner, cold air flows into the openings 72b, 76b, and 80b, hot air flows into the openings 74a, 78a, and 82a, the hot and cold air mixes in the mixing chamber 84, and the mixed air flows to the openings 72a, 74b, 76a, 78b, 80a, and 82b.

Referring to FIGS. 10 through 12, the door 52 may be used in place of the door 18, and the door 52 may be adjusted to various positions to control the temperature and distribution of airflow exiting the HVAC system 10. FIG. 10 shows the door 52 adjusted to the first position discussed above with reference to FIG. 3. When the door 52 in the first position, the door 52 blocks hot airflow from the heater core 16, blocks airflow to the outlet 22, and allows cold air to flow directly from the evaporator 14 to the outlet 20. Cold air may flow through the door 52 via any one of the channels 72 through 82.

FIG. 11 shows the door 52 adjusted to the second position. When the door 52 is in the second position, the door 52 allows cold airflow from the evaporator 14, hot airflow from the heater core 16, and mixed airflow to both of the outlets 20, 22. Hot air enters the door 52 through the opening 74a of the channel 74 (i.e., the hot air channel), and cold air enters the door 52 through the opening 76b of the channel 76 (i.e., the cold air channel). The hot and cold air may mix in the mixing chamber 84, and the mixed air may flow through the openings 74b, 76a. In this manner, the mixing chamber 84 improves the mixing of hot and cold air flowing through the door 52.

FIG. 12 shows the door 52 adjusted to the third position discussed above with reference to FIG. 3. When the door 52 in the third position, the door 52 blocks cold airflow from the evaporator 14, blocks airflow to the outlet 20, and allows hot air to flow from the heater core 16 to the outlet 22. Hot air may flow through the door 52 via any one of the channels 72 through 82.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heating, venting, and air conditioning (HVAC) system for a vehicle, comprising:
    a blower operable to blow air;
    an evaporator positioned downstream from the blower and operable to cool air flowing through the evaporator,
    a heater core positioned downstream from the evaporator and operable to heat air flowing through the heater core; and
    a single door positioned downstream from the heater core and rotatable to control airflow through the heater core and to direct airflow to at least one of a first outlet and a second outlet; wherein
    the single door is rotatable to a first position to block airflow from the heater core, block airflow to the second outlet, and allow airflow directly from the evaporator to the first outlet;
    the single door is rotatable to a second position to allow airflow directly from the evaporator and the heater core and to the first outlet and the second outlet;
    the single door is rotatable to a third position to block airflow directly from the evaporator, block airflow to the first outlet, and allow airflow directly from the heater core to the second outlet;
    the single door includes closed sides, closed ends, at least partially open sides, and bosses projecting from the closed sides and centered about a rotational axis of the single door;
    the closed sides are flat and the closed ends are round; and
    the single door includes a partition disposed between the closed sides and between the closed ends, the partition defining channels that extend between the at least partially open sides.

2. The HVAC system of claim 1, further comprising a sliding door positioned upstream from the heater core and adjustable to control airflow to the heater core.

3. The HVAC system of claim 1, wherein when the single door is in the second position, the channels include hot air channels receiving hot air from the heater core and cold air channels receiving cold air from the evaporator.

4. The HVAC system of claim 3, wherein the partition defines a mixing chamber extending between the closed sides and connecting the hot and cold air channels, allowing hot and cold air from the hot and cold air channels to mix.

5. A heating, venting, and air conditioning system for a vehicle, comprising:
    a blower operable to blow air;
    an evaporator positioned downstream from the blower and operable to cool air flowing through the evaporator;
    a heater core positioned downstream from the evaporator and operable to heat air flowing through the heater core; and
    a single door positioned downstream from the heater core and rotatable to control airflow through the heater core and to direct airflow to at least one of a first outlet and a second outlet; wherein
    the door includes a first and a second opening;
    when the door is in a first position, air flows in the first opening and out the second opening;
    when the door is in the second position, air flows in the first and second openings and out the first and second openings.

6. The HVAC system of claim 5, wherein when the door is in the first position, the air flow in only the first opening and out only the second opening.

7. The HVAC system of claim 6, wherein the first and second openings are single openings.

8. A heating, venting, and air conditioning system for a vehicle, comprising:
    a blower operable to blow air;
    an evaporator positioned downstream from the blower and operable to cool air flowing through the evaporator;
    a heater core positioned downstream from the evaporator and operable to heat air flowing through the heater core; and a single door positioned downstream from the heater core and rotatable to control airflow through the heater core and to direct airflow to at least one of a first outlet and a second outlet; wherein the door includes a first and a second opening;

when the door is in the first position, air flows through the door by entering the first opening and exiting the second opening;

when the door is in a second position, air flows through the door by entering the first and second openings and exiting the first and second openings.

9. The HVAC system of claim 8, wherein when the door is in the first position the air enters only the first opening and exits only the second opening.

10. The HVAC system of claim 9, wherein the first and second openings are single openings.

* * * * *